Figure 1:
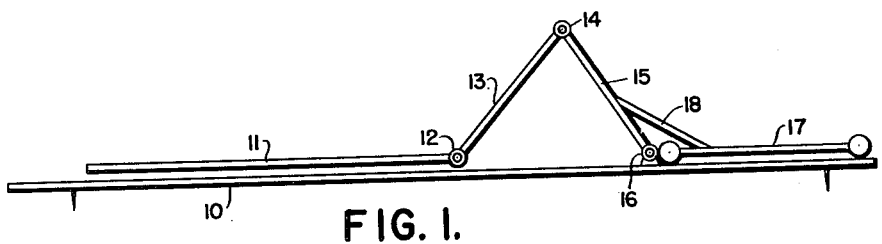

March 9, 1954 — B. L. TAYLOR — 2,671,533
SELF-RESETTING CHOCK
Filed Aug. 16, 1951

INVENTOR
Bert L. Taylor
BY Sanford Schnurmacher
ATTORNEY

Patented Mar. 9, 1954

2,671,533

UNITED STATES PATENT OFFICE 2,671,533

SELF-RESETTING CHOCK

Bert L. Taylor, Cleveland, Ohio

Application August 16, 1951, Serial No. 242,080

2 Claims. (Cl. 188—32)

The present invention relates to a self-resetting chock and it consists in the combinations, constructions and arrangements of parts herein described and claimed.

Generally there is provided a chock which is particularly adapted to be placed in parking lots or like positions where it is desired to have automobiles and like vehicles stop in a particular location. The device consists of a base plate atop which rests a wheel supporting plate to the rear of which is hingedly connected an upwardly and rearwardly extending wheel stop plate. To the rearward end of the latter there is hingedly connected an intermediate plate which is, in turn, affixed to a normally horizontal stop plate which lies at the rear of the base plate. The intermediate plate normally extends forwardly and upwardly to its connection with the stop plate but when an automobile wheel is impressed upon the stop plate and intermediate plate the two are flattened downwardly against the base plate to thus cause the rearward stop plate to rise to a position extending upwardly and rearwardly to thus form a second stop plate. Thus when an automobile is driven over the device and one of the wheels first comes into contact with the first stop plate the driver of the car will be warned that he has reached a position where he should stop his car. If, however, the car is driven over the first stop plate the normally horizontal stop plate, described hereinabove, will move to its alternate upwardly extending position to act as a second stop plate to warn the driver that the car should be stopped. If the car is driven entirely over the device, the passage of the wheel over the second stop plate will cause the first stop plate to be reset.

Should the car again then move forwardly the identical actions will take place in the same order as previously set forth and the device will again be reset to its original position.

It is accordingly an object of the invention to provide a novel self-resetting wheel chock.

Another object of the invention is to provide a device of the character set forth which is simple in construction, inexpensive to manufacture and yet effective and efficient in use.

Figure 2:
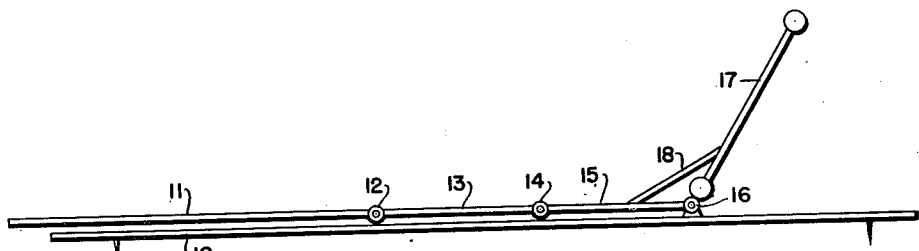
Figure 3:
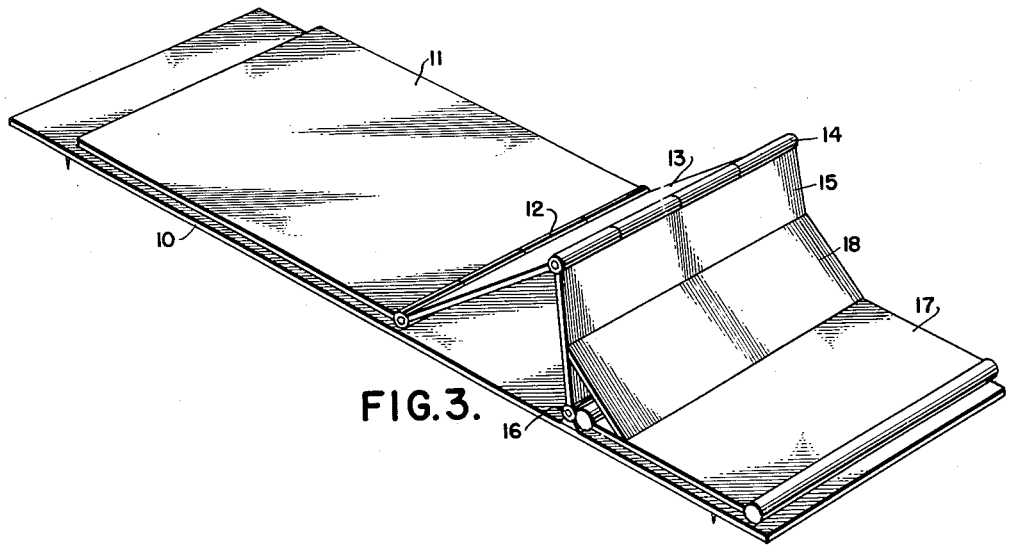

Other and further objects of the invention will become apparent from a reading of the following specification taken in conjunction with the drawing, in which:

Figure 1 is a side elevational view of an embodiment of the invention shown in its normal position, Figure 2 is a view similar to Figure 1 but showing a second stop plate forming a part of the invention in its raised position, and Figure 3 is a perspective view of the device as illustrated in Figure 1.

Referring more particularly to the drawing, there is shown therein a wheel chock of the character set forth having a substantially rectangular base plate 10 upon which rests a car supporting plate 11. To the rearward edge of the support plate 11 there is hingedly connected, as indicated at 12, a first stop plate 13 which normally extends upwardly and rearwardly as viewed in Figures 1 and 3 and to the rearward edge of which there is hingedly connected, as indicated at 14, an intermediate plate 15. The intermediate plate 15 normally extends rearwardly and downwardly and is hinged, as indicated at 16, to the base plate.

A second or rearward stop plate 17 is connected by means of a web 18 to the upper side of the intermediate plate 15 and the plate 17 normally lies flat against the base plate 10, as viewed for example in Figures 1 and 3 of the drawing.

In operation, it will be apparent that the support plate 11 is adapted to normally support one of the wheels of an automobile preferably the left front wheel thereof. The wheel is adapted to be driven upon the plate 11 until it contacts the first stop plate 13 whereupon the driver of the car will be warned that he should stop the automobile. If, however, his momentum is such that he does not stop and the car proceeds onward, the plates 13 and 15 will be forced downwardly into contact with the base plate 10, as viewed in Figure 2 of the drawing whereupon the second stop plate 17 will be drawn to an upward position wherein it extends upwardly and rearwardly as viewed in Figure 2 thus forming a second stop plate for the wheel of the automobile. Again, should the car come into contact with the plate 17, the driver will again be warned that he should stop his car. Should he continue on in a forward direction, the weight of the car will force the plate 17 downwardly and consequently the plate 15 will be pivoted on its pivot point 16 in an upward direction to thus draw the first stop plate 13 and the support plate 11 to their original positions as shown in Figure 1. Likewise, when the car is then again driven toward and upon the plate 11 the above action will take place and the device will again be automatically reset.

While but one form of the invention has been shown and described herein, it will be readily apparent to those skilled in the art that many minor modifications may be made without departing from the spirit of the invention or the scope of the appended claims.

What is claimed is:

1. A device of the character described comprising a base plate, a support plate positioned upon said base plate, a forward stop plate hinged to the rear of said support plate, an intermediate plate hinged to the rear of said forward stop plate at its forward edge and to said base plate at its rearward edge, a rearward stop plate, and a web interconnecting said rearward stop plate and said intermediate plate.

2. A device of the character described comprising a base plate, a support plate positioned upon said base plate, a forward stop plate hinged to the rear of said support plate, an intermediate plate hinged to the rear of said forward stop plate at its forward edge and to said base plate at its rearward edge, a rearward stop plate, a web interconnecting said rearward stop plate and said intermediate plate, and means for attaching said base plate to the ground.

BERT L. TAYLOR.

References Cited in the file of this patent

UNITED STATES PATENTS

| Number | Name | Date |
| --- | --- | --- |
| 1,922,552 | McCosh | Aug. 15, 1933 |
| 1,922,553 | McCosh | Aug. 15, 1933 |
| 2,471,756 | Larson | May 31, 1949 |